United States Patent
Gruber et al.

(10) Patent No.: US 12,452,818 B2
(45) Date of Patent: Oct. 21, 2025

(54) HANDLING PLMN PRIORITIZATION

(71) Applicant: Apple Inc., Cupertino, CA (US)

(72) Inventors: Roland Gruber, Sauerlach (DE); Deepak Dash, Bangalore (IN); Nitin Kuppelur, Bangalore (IN)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 18/251,766

(22) PCT Filed: Nov. 4, 2021

(86) PCT No.: PCT/US2021/072230
§ 371 (c)(1),
(2) Date: May 4, 2023

(87) PCT Pub. No.: WO2022/099281
PCT Pub. Date: May 12, 2022

(65) Prior Publication Data
US 2023/0422197 A1      Dec. 28, 2023

(30) Foreign Application Priority Data

Nov. 4, 2020    (IN) .............................. 202041048157

(51) Int. Cl.
*H04W 60/00*    (2009.01)
*H04W 48/16*    (2009.01)
(Continued)

(52) U.S. Cl.
CPC ........... *H04W 60/00* (2013.01); *H04W 48/16* (2013.01); *H04W 48/18* (2013.01); *H04W 60/04* (2013.01); *H04W 84/042* (2013.01)

(58) Field of Classification Search
CPC ............................... H04W 48/16; H04W 60/00
See application file for complete search history.

(56) References Cited

U.S. PATENT DOCUMENTS

2013/0237184 A1*  9/2013  Cattan ................. H04W 8/08
                                                    455/406
2018/0310162 A1  10/2018  Kim et al.
(Continued)

FOREIGN PATENT DOCUMENTS

CN      107637160      1/2018
WO      2019/017689    1/2019

OTHER PUBLICATIONS

3rd Generation Partnership Project; Technical Specification Group Core Network and Terminals; Non-Access-Stratum (NAS) functions related to Mobile Station (MS) in idle mode (Release 17), 3GPP TS 23.122 V17.0.0, Sep. 24, 2020, 83 sheets.
(Continued)

*Primary Examiner* — William G Trost, IV
(74) *Attorney, Agent, or Firm* — Fay Kaplun & Marcin, LLP

(57) ABSTRACT

A user equipment (UE) transmits a registration request message to a first public land mobile network (PLMN), wherein the first PLMN is a roaming PLMN, receives a registration accept message from the first PLMN, determines that the registration accept message includes a manipulated steering of roaming (SoR) container or does not include a SoR container, wherein the SoR container is configured by a home PLMN (HPLMN) of the UE and transmitted to the first PLMN from the HPLMN, determines that the registration accept message includes an indication that the first PLMN does not support voice over packet switching (VoPS) and adds the first PLMN to a first list of PLMNs in which voice service is not possible in an N1 mode.

21 Claims, 3 Drawing Sheets

(51) Int. Cl.
*H04W 48/18* (2009.01)
*H04W 60/04* (2009.01)
*H04W 84/04* (2009.01)

(56) References Cited

U.S. PATENT DOCUMENTS

| | | | |
|---|---|---|---|
| 2019/0268752 A1* | 8/2019 | Buckley | H04W 8/06 |
| 2019/0313238 A1 | 10/2019 | Palanigounder et al. | |
| 2020/0221281 A1* | 7/2020 | Rajadurai | H04W 76/30 |
| 2021/0051466 A1* | 2/2021 | Kumar | H04W 8/06 |
| 2022/0377576 A1* | 11/2022 | Iwakuni | H04W 28/18 |

OTHER PUBLICATIONS

Huawei, HiSilicon, PLMN selection when UE's NI mode capability is disabled per access type, 3GPP TSG-CT WG1 Meeting #112, C1-185412, Aug. 13, 2018, 5 sheets.

3rd Generation Partnership Project; Technical Specification Group Core Network and Terminals; 5G System; Steering of roaming application function services; Stage 3 (Release 16), 3GPP TS 29.550 V16.2.0, Sep. 25, 2020, 21 sheets.

NTT Docomo et al., "SoR support for different registration types"; 3GPP TSG-SA2 Meeting #136, S2-1912563, Nov. 22, 2019, 30 sheets.

\* cited by examiner

HANDLING PLMN PRIORITIZATION

BACKGROUND 5G new radio (NR) wireless communications support updates to user equipment (UE) parameters by a home PLMN (HPLMN) while the UE is roaming. The HPLMN update of parameters are based on the policies of the network provider. For example, according to current 3GPP standards, parameters such as the steering of roaming (SoR) list may be updated on the UE by the HPLMN. However, there are scenarios where the UE parameters may not be updated in the correct manner.

SUMMARY

Some exemplary embodiments are related to a user equipment (UE) having a transceiver configured to connect to a plurality of networks and a processor communicatively coupled to the transceiver and configured to perform operations. The operations include transmitting a registration request message to a first public land mobile network (PLMN), wherein the first PLMN is a roaming PLMN, receiving a registration accept message from the first PLMN, determining that the registration accept message includes a manipulated steering of roaming (SoR) container or does not include a SoR container, wherein the SoR container is configured by a home PLMN (HPLMN) of the UE and transmitted to the first PLMN from the HPLMN, determining that the registration accept message includes an indication that the first PLMN does not support voice over packet switching (VoPS) and adding the first PLMN to a first list of PLMNs in which voice service is not possible in an N1 mode.

Other exemplary embodiments include a processor of a user equipment (UE) configured to perform operations. The operations include transmitting a registration request message to a first public land mobile network (PLMN), wherein the first PLMN is a roaming PLMN, receiving a registration accept message from the first PLMN, determining that the registration accept message includes a manipulated steering of roaming (SoR) container or does not include a SoR container, wherein the SoR container is configured by a home PLMN (HPLMN) of the UE and transmitted to the first PLMN from the HPLMN, determining that the registration accept message includes an indication that the first PLMN does not support voice over packet switching (VoPS) and adding the first PLMN to a first list of PLMNs in which voice service is not possible in an N1 mode.

Still further exemplary embodiments are related to a method performed by a user equipment (UE). The method includes transmitting a registration request message to a first public land mobile network (PLMN), wherein the first PLMN is a roaming PLMN, receiving a registration accept message from the first PLMN, determining that the registration accept message includes a manipulated steering of roaming (SoR) container or does not include a SoR container, wherein the SoR container is configured by a home PLMN (HPLMN) of the UE and transmitted to the first PLMN from the HPLMN, determining that the registration accept message includes an indication that the first PLMN does not support voice over packet switching (VoPS) and adding the first PLMN to a first list of PLMNs in which voice service is not possible in an N1 mode.

DETAILED DESCRIPTION

Figure 1:
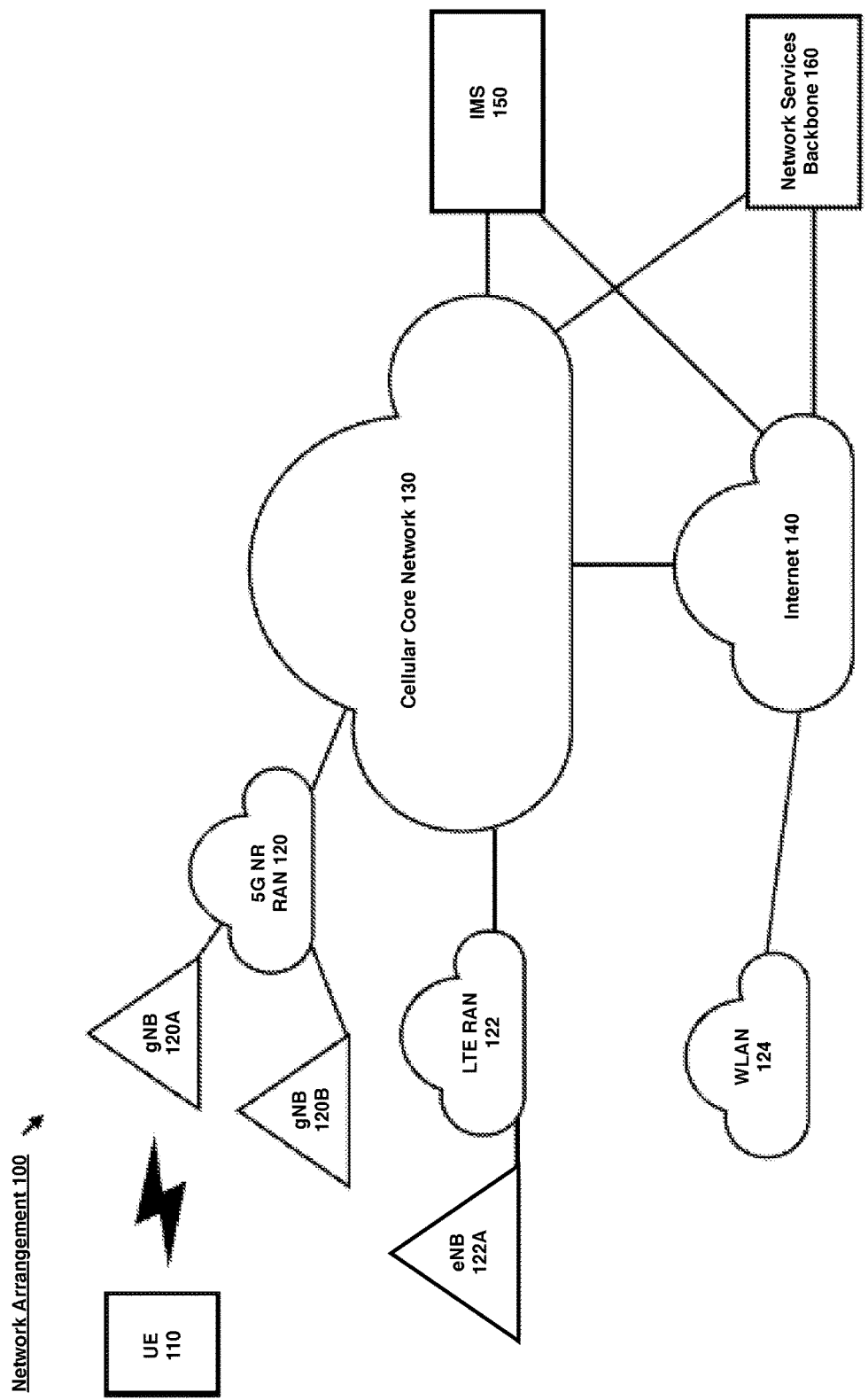
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe manners for a user equipment (UE) to select a radio access technology (RAT)/public land mobile network (PLMN) combination while roaming.

The exemplary embodiments are described with regard to a network that includes 5G (new radio) NR RAT. However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

Based on current Third Generation Partnership Project (3GPP) standards TS 24.501 and 23.122, a UE, which registers on a roaming PLMN without a voice over packet switch (VoPS) indication from the network and whose usage setting is voice centric, is to disable its 5G NR RAT services on the current PLMN and search for other RATS (e.g., legacy RATS such as Long Term Evolution (LTE)) on the same PLMN.

In addition, in some cases, the subscriber identity module (SIM) of a UE may be configured with an indication that the UE is to receive the steering of roaming (SoR) transparent container information element (IE). When a home PLMN (HPLMN) sends the SoR container including a preferred PLMN list to the UE via a roaming PLMN, the HPLMN adds a unique signature to encrypt the container. If the roaming PLMN attempts to manipulate the SoR container or fails to forward the container to the UE altogether, the UE will designate the roaming PLMN as a lowest priority PLMN and proceed to search for a higher priority PLMN that may support a 5G RAT.

An issue that arises is when both of these scenarios arise simultaneously. The current 3GPP standards do not address a scenario where both (1) the roaming PLMN indicates that the network does not support VoPS and (2) the SoR container is not received in the Registration Accept message received from the roaming PLMN.

According to some exemplary embodiments, when both scenarios (1 and 2) described above occur simultaneously, the UE adds the current PLMN to a list of PLMNs on which voice services (e.g., VoPS) on 5G RAT (e.g., N1 mode) are temporarily not supported and to a list of PLMNs where registration was aborted due to SoR failure. As a result, the UE does not immediately disable its 5G RAT services and instead begins to search for 5G RATS on higher priority PLMNs. If no higher priority PLMNs with RAT are found, the UE will then disable its 5G RAT services and camp on a legacy RAT of the current PLMN.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 also manages the traffic that flows between the cellular network and the Internet 140. The cellular core network 130 may be considered to be the interconnected set of components that manages the operation and traffic of the cellular network. The cellular core network may include various other components performing any of a variety of different functions.

Figure 2:
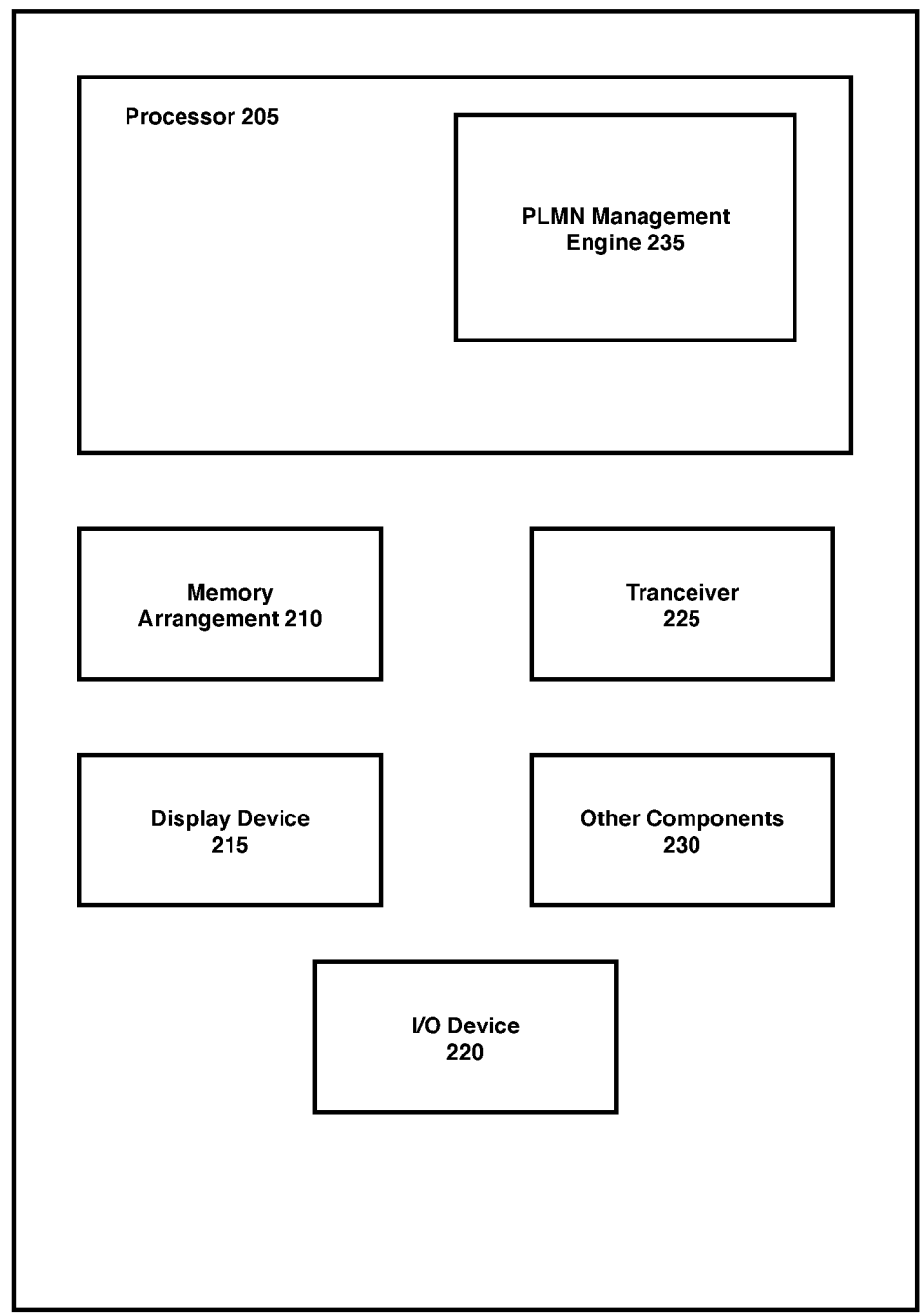
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. It should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an PLMN management engine 235. As will be described in more detail below, the PLMN management engine 235 may perform various operations related to camping on a PLMN based on, for example, a stored PLMN list.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
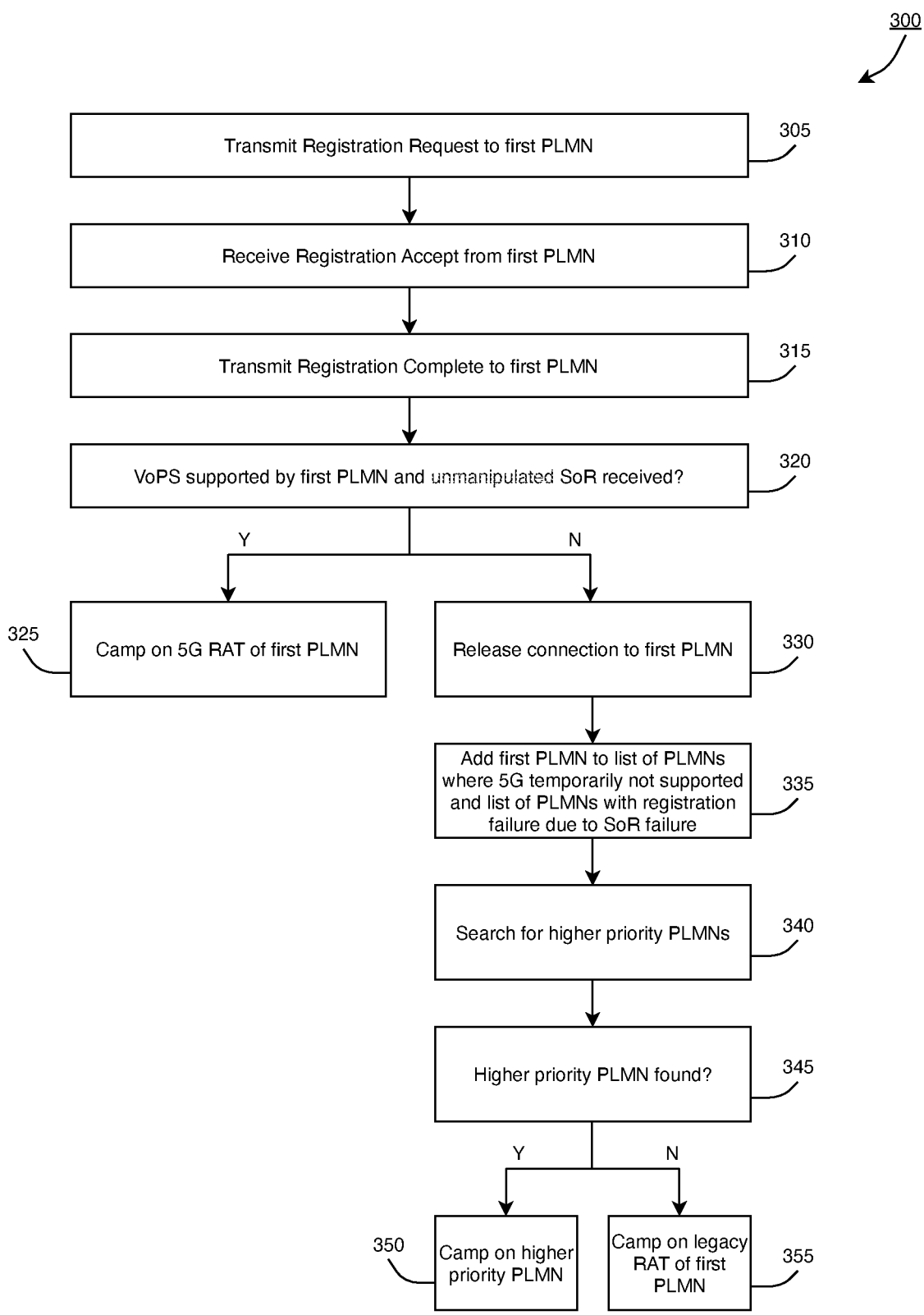
FIG. 3 shows a method of selecting a radio access technology (RAT)/public land mobile network (PLMN) combination according to various exemplary embodiments.

FIG. 3 shows a method 300 of selecting a radio access technology (RAT)/public land mobile network (PLMN) combination according to various exemplary embodiments. In the example of FIG. 3, it may be considered that a usage setting of the UE 110 is voice centric and that a SIM of the UE 110 is configured with an indication that the UE is to receive the SoR transparent container IE.

At 305, the UE 110 sends a registration request to a first PLMN (e.g., a gNB of the first PLMN) while roaming. Although not shown in FIG. 3, the first PLMN transmits an Nudm_SDM_Get_request message to the HPLMN to obtain an SoR container from the HPLMN. At 310, the UE 110 receives a registration accept transmission from the first PLMN. In some embodiments, the registration accept transmission includes the SoR container and an indication of whether the first PLMN supports VoPS services. At 315, the UE 110 may transmit a Registration Complete message to the first PLMN. In some embodiments, the UE may alternatively not transmit the Registration Complete message if it determines that it will not ultimate camp on this PLMN.

At 320, the UE 110 determines if the first PLMN supports VoPS and if an unmanipulated SoR container was received in the registration accept transmission. It should be noted that the answer to the latter (the unmanipulated SoR container) will be negative if the SoR container was entirely not received or if the SoR container was received but the UE 110 determines that the first PLMN tried to manipulate the SoR container.

Although the following description addresses the scenarios in which both parameters are answered in either the affirmative or the negative, it should be noted that if the answer to one is affirmative and the other is negative (e.g., VoPS is supported, but SoR not received, or vice versa), then the UE 110 will act according to the standards defined in 3GPP 24.501 and 23.122.

If the UE 110 determines that VoPS is supported by the first PLMN and that an unmanipulated SoR has been received, then at 325, the UE 110 camps on the 5G RAT of the first PLMN. However, if the UE 110 determines VoPS is not supported by the first PLMN and that an unmanipulated SoR has not been received, then, at 325, the UE 110 releases the connection to the first PLMN. Subsequently, at 335, the UE 110 adds the first PLMN to a list of PLMNs on which voice services (e.g., VoPS) on 5G RAT (e.g., N1 mode) are temporarily not supported and also to a list of PLMNs where registration was aborted due to failure to receive an unmanipulated SoR container. As a result, the first PLMN is assigned a lowest priority. However, the UE 110 does not immediately disable its 5G RAT services At 340, the UE 110 searches for higher priority PLMNs with a 5G RAT and other available RATS supported by the UE 110. In some embodiments, this search may be based on a PLMN priority list stored on the UE 110 (e.g., locally, on the SIM). At 345, the UE 110 determines if a higher priority PLMN has been found. If so, then, at 350, the UE 110 camps on the higher priority PLMN. If, however, a higher priority PLMN has not been found, then the UE 110 disables its 5G RAT services and camps on a legacy RAT (e.g., LTE, 3G, etc.) of the first PLMN. As a result of the method 300, the probability that the UE 110 will camp on a low priority PLMN is advantageously minimized, thus improving user experience and minimizing roaming charges.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a transceiver configured to connect to a plurality of networks; and
a processor communicatively coupled to the transceiver and configured to perform operations comprising:
transmitting a registration request message to a first public land mobile network (PLMN), wherein the first PLMN is a roaming PLMN;
receiving a registration accept message from the first PLMN;
determining that the registration accept message includes a manipulated steering of roaming (SoR) container or does not include a SoR container, wherein the SoR container is configured by a home PLMN (HPLMN) of the UE and transmitted to the first PLMN from the HPLMN;
determining that the registration accept message includes an indication that the first PLMN does not support voice over packet switching (VoPS); and
adding the first PLMN to a first list of PLMNs in which voice service is not possible in an N1 mode.

2. The UE of claim 1, wherein the operations further comprise:
adding the first PLMN to a second list of PLMNs in which registration has been aborted due to SoR container failure.

3. The UE of claim 2, wherein the operations further comprise:
releasing a connection to the first PLMN.

4. The UE of claim 2, wherein inclusion on the second list indicates that the first PLMN is a lowest priority PLMN.

5. The UE of claim 4, wherein the operations further comprise:
searching for a second PLMN having a higher priority than the first PLMN.

6. The UE of claim 5, wherein the operations further comprise:
when the second PLMN is found, camping on the second PLMN.

7. The UE of claim 5, wherein the operations further comprise:
when the second PLMN is not found, camping on a legacy RAT of the first PLMN.

8. A processor of a user equipment (UE) configured to perform operations comprising:
transmitting a registration request message to a first public land mobile network (PLMN), wherein the first PLMN is a roaming PLMN;
receiving a registration accept message from the first PLMN;
determining that the registration accept message includes a manipulated steering of roaming (SoR) container or does not include a SoR container, wherein the SoR container is configured by a home PLMN (HPLMN) of the UE and transmitted to the first PLMN from the HPLMN;

determining that the registration accept message includes an indication that the first PLMN does not support voice over packet switching (VoPS); and adding the first PLMN to a first list of PLMNs in which voice service is not possible in an N1 mode.

9. The processor of claim 8, wherein the operations further comprise:

adding the first PLMN to a second list of PLMNs in which registration has been aborted due to SoR container failure.

10. The processor of claim 9, wherein the operations further comprise:

releasing a connection to the first PLMN.

11. The processor of claim 9, wherein inclusion on the second list indicates that the first PLMN is a lowest priority PLMN.

12. The processor of claim 11, wherein the operations further comprise:

searching for a second PLMN having a higher priority than the first PLMN.

13. The processor of claim 12, wherein the operations further comprise:

when the second PLMN is found, camping on the second PLMN.

14. The processor of claim 12, wherein the operations further comprise:

when the second PLMN is not found, camping on a legacy RAT of the first PLMN.

15. A method performed by a user equipment (UE), comprising:

transmitting a registration request message to a first public land mobile network (PLMN), wherein the first PLMN is a roaming PLMN;

receiving a registration accept message from the first PLMN;

determining that the registration accept message includes a manipulated steering of roaming (SoR) container or does not include a SoR container, wherein the SoR container is configured by a home PLMN (HPLMN) of the UE and transmitted to the first PLMN from the HPLMN;

determining that the registration accept message includes an indication that the first PLMN does not support voice over packet switching (VoPS); and adding the first PLMN to a first list of PLMNs in which voice service is not possible in an N1 mode.

16. The method of claim 15, further comprising:

adding the first PLMN to a second list of PLMNs in which registration has been aborted due to SoR container failure.

17. The method of claim 16, further comprising:

releasing a connection to the first PLMN.

18. The method of claim 16, wherein inclusion on the second list indicates that the first PLMN is a lowest priority PLMN.

19. The method of claim 18, further comprising:

searching for a second PLMN having a higher priority than the first PLMN.

20. The method of claim 19, further comprising:

when the second PLMN is found, camping on the second PLMN.

21. The method of claim 19, further comprising:

when the second PLMN is not found, camping on a legacy RAT of the first PLMN.

* * * * *